(12) United States Patent
Satoh

(10) Patent No.: US 8,531,499 B2
(45) Date of Patent: Sep. 10, 2013

(54) OPTICAL SCANNER AND IMAGE FORMING APPARATUS INCLUDING SAME

(75) Inventor: Masaki Satoh, Natori (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 12/556,999

(22) Filed: Sep. 10, 2009

(65) Prior Publication Data

US 2010/0067927 A1    Mar. 18, 2010

(30) Foreign Application Priority Data

Sep. 17, 2008  (JP) ................................. 2008-237770

(51) Int. Cl.
*B41J 15/14* (2006.01)
*B41J 27/00* (2006.01)
*B41J 2/435* (2006.01)
*G02B 26/08* (2006.01)
*G02B 26/10* (2006.01)
*G02B 26/12* (2006.01)

(52) U.S. Cl.
USPC ........... 347/260; 347/243; 347/248; 347/250; 359/199.1

(58) Field of Classification Search
USPC ................. 347/233–237, 243, 246–250, 259, 347/260; 359/199.1
See application file for complete search history.

(56) References Cited

U.S. PATENT DOCUMENTS

| 7,218,432 B2 * | 5/2007 | Ichii et al. .................. 359/204.4 |
| 2004/0051033 A1 * | 3/2004 | Hagen et al. .................. 250/234 |

FOREIGN PATENT DOCUMENTS

| JP | 2003-131151 | 5/2003 |
| JP | 2004-110030 | 4/2004 |
| JP | 2007-522528 | 8/2007 |
| JP | 2007-526506 | 9/2007 |
| JP | 2007-298651 | 11/2007 |
| JP | 2008-9073 | 1/2008 |
| WO | WO 2005/078506 A2 | 8/2005 |
| WO | WO 2005/078507 A1 | 8/2005 |

OTHER PUBLICATIONS

Office Action issued Jun. 15, 2012 in Japanese Patent Application No. 2008-237770.

* cited by examiner

*Primary Examiner* — Uyen Chau N Le
*Assistant Examiner* — John M Bedtelyon
(74) *Attorney, Agent, or Firm* — Oblon, Spivak, McClelland, Maier & Neustadt, L.L.P.

(57) ABSTRACT

An optical scanner includes a light source, a scan-deflecting portion including a resonance mirror to scan and deflect along a scan line, a plurality of light receiving sensors for synchronous detection provided on the scan line, a phase controller, an amplitude controller, and an offset controller. The phase controller obtains a difference between a true phase and a target phase, and generates a drive signal incorporating the difference between the true phase and the target phase. The amplitude controller incorporates the difference between a value equivalent of a true amplitude and a value equivalent of a target amplitude into the drive signal generated by the phase controller. The offset controller calculates an offset value by obtaining the difference between each of the time intervals, incorporates the difference between the offset value and a target offset value in the amplitude-controlled drive signal, and supply the drive signal to a driving device.

9 Claims, 10 Drawing Sheets

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2008-237770 filed on Sep. 17, 2008 in the Japan Patent Office, which is hereby incorporated herein by reference in its entirety.

BACKGROUND OF THE INVENTION

1. Field of the Invention

Exemplary aspects of the present invention generally relate to an optical scanner and an image forming apparatus including the same, and more particularly, to an optical scanner using a resonance mirror.

2. Description of the Background Art

Conventionally, a known method of writing an image on a photoreceptor drum includes rotating a polygon mirror to reflect and scan a laser beam emitted from a light source. To accommodate increasing demand for high-speed and high-resolution imaging, the speed of rotation of the polygon mirror is increased, causing a rise in temperature, an increase in noise, and accelerated degradation of the polygon motor that drives the polygon motor. Thus, there is a limitation on how much the speed of rotation of the polygon mirror can be increased.

Figure 8:
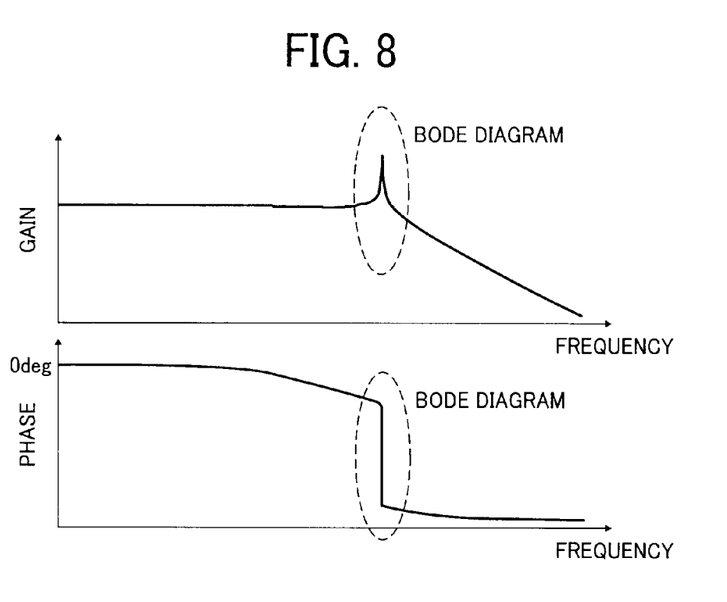
FIG. 8 is a diagram illustrating a frequency transfer characteristics of a micromirror.

In the meantime, with advances in precision processing technologies such as Micro Electro Mechanical System (MEMS), an alternative to the polygon mirror has been proposed in the form of an optical scan method using the mechanical resonance of a micromirror having frequency transfer characteristics as shown in FIG. 8. Compared with the polygon mirror, the optical scan method is advantageous in that small size, low weight, low noise, low heat emission, and low power consumption can be achieved. For this reason, it is expected that MEMS will eventually replace the polygon mirror.

Figure 9:
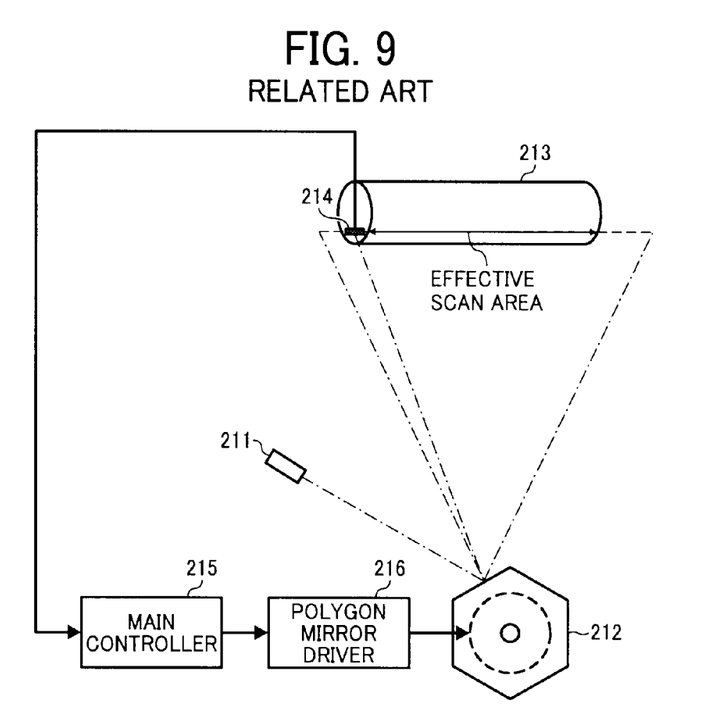
FIG. 9 is a schematic diagram illustrating a related-art optical scanner using a polygon mirror.

Nevertheless, in order to facilitate an understanding of the related art and of the novel features of the present invention, a description is now provided of a configuration of a related-art optical scanner using the polygon mirror with reference to FIG. 9. FIG. 9 is a schematic diagram illustrating such related-art optical scanner.

As illustrated in FIG. 9, the optical scanner includes a polygon mirror driver 216, a light source 211, a polygon mirror 212, and a light-receiving sensor 214. The light-receiving sensor 214 is disposed on a scan-start side of an effective scan area relative to the polygon mirror 212. In FIG. 9, a laser beam emitted from the light source 211 is reflected by the polygon mirror 212 and illuminates the surface of a photoreceptor drum 213.

Since the polygon mirror 212 rotates at a constant speed, the laser beam scans the effective scan area of the photoreceptor drum 213 at a constant angular speed. The light-receiving sensor 214 is provided at the scan-start side of the effective scan area to detect timing of the laser beam passing by.

The output of the light-receiving sensor 214 is supplied to a main controller 215. The main controller 215 controls the polygon mirror driver 216 of the polygon mirror 212 such that the speed of rotation of the polygon mirror 212 coincides with a target speed of rotation while obtaining information on writing timing.

By contrast, as the alternative method to the scan method using the polygon mirror as described above, there is growing interest in the micromirror because of its low heat emission and low power consumption. Compared with constant rotation of an inertial body such as the polygon mirror, the micromirror needs to be oscillated in a simple harmonic motion at a frequency near the resonance frequency. By contrast, in the case of the polygon mirror, since the laser beam moves at a constant angular speed, the linear velocity of the laser beam increases as the laser beam approaches the end portion of the surface of the photoreceptor compared to the center of the photoreceptor.

With the micromirror, the angle of the mirror changes in a sine wave manner along the time axis, so that the linear velocity of the laser beam decreases as the laser beam approaches the end portion of the photoreceptor surface, as compared with the center of the photoreceptor. Deviations in the linear velocity are corrected by a lens optical system.

Figure 10:
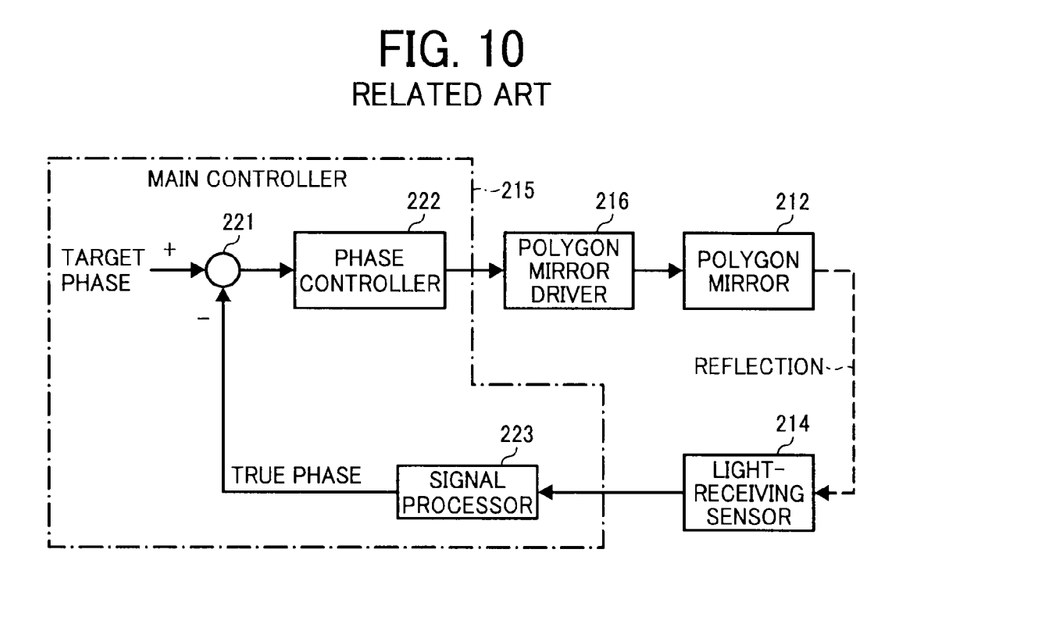
FIG. 10 is a block diagram illustrating a control system of the related-art optical scanner.
Figure 11:
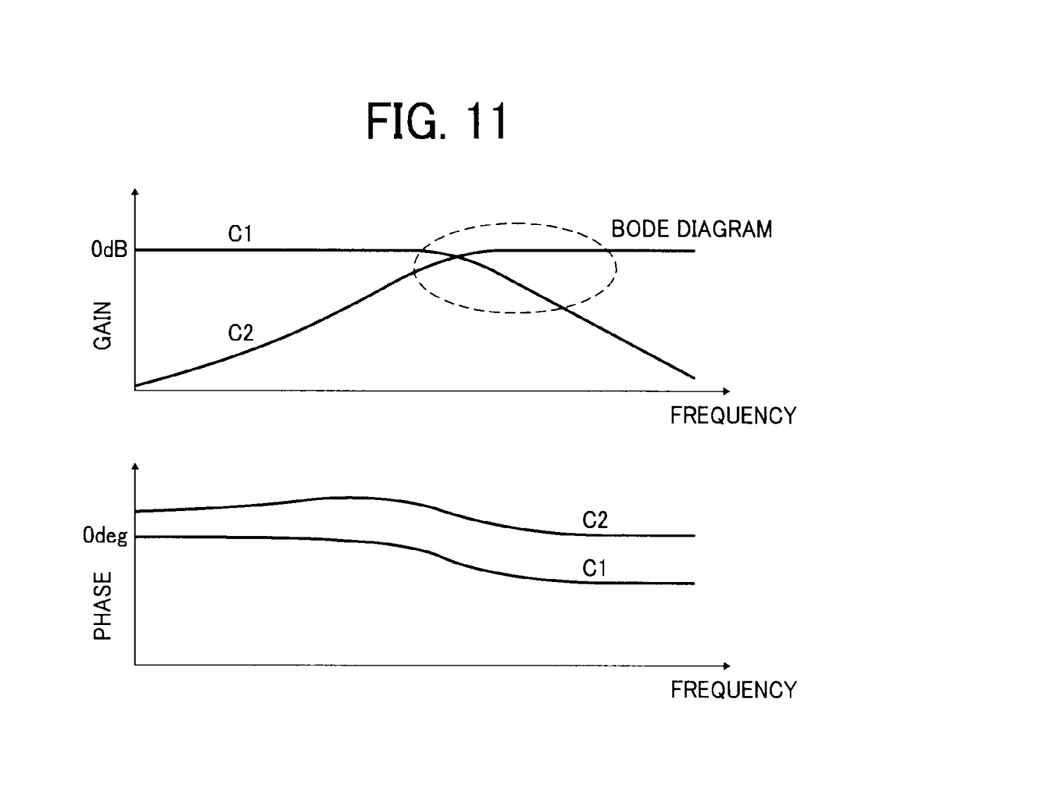
FIG. 11 is a diagram illustrating a closed-loop response of an ideal continuous-time control system.

Referring now to FIG. 10, there is provided a block diagram illustrating the configuration of the related-art optical scanner using the polygon mirror. The polygon mirror (the inertial body) including a plurality of mirror faces is rotated at a constant speed.

As illustrated in FIG. 10, the light-receiving sensor 214 detects the reflected light from the polygon mirror 212. Based on the output of the light-receiving sensor 214, a signal processor 223 converts the output to a true phase. Subsequently, the true phase is compared with a target phase by a comparator 221. Based on the difference in the phase, a phase controller 222 controls the polygon mirror driver 216 such that the speed of rotation of the polygon mirror 212 coincides with the target speed of rotation.

The optical scanner using the polygon scanner is advantageous in that an accurate rotation speed can be obtained by such a simple phase-locked loop (PLL) control. By contrast, in a case of the micromirror, due to its structure, the micromirror needs to be accurately oscillated in the simple harmonic motion. Thus, the method of rotating the inertial body at a constant speed cannot be applied to this configuration.

Furthermore, a drawback to this technology is that writing operation needs to be performed with precision relative to the photoreceptor by the simple harmonic oscillation of the micromirror, necessitating high-precision beam scanning. In particular, amplitude accuracy in a main scan direction is required for good imaging quality for a printer.

In general, such a resonance mirror is used under atmospheric pressure or reduced-pressure atmosphere conditions. Consequently, when the mirror is operated with simple harmonic oscillation at a frequency near the resonance frequency, the amplitude accuracy is subject to degradation due to disturbance around the mirror.

To counteract such a problem and achieve a desirable amplitude accuracy, some kind of feedback control is necessary. In order to provide a feedback control system at low cost, it is necessary to detect amplitude information in discrete time. Furthermore, since it is a system in which a sampling frequency of the amplitude information depends on a drive frequency, in reality, the response exhibits the closed-loop response of the discrete time control system relative to an ideal closed-loop response of the continuous-time control system.

Figure 12:
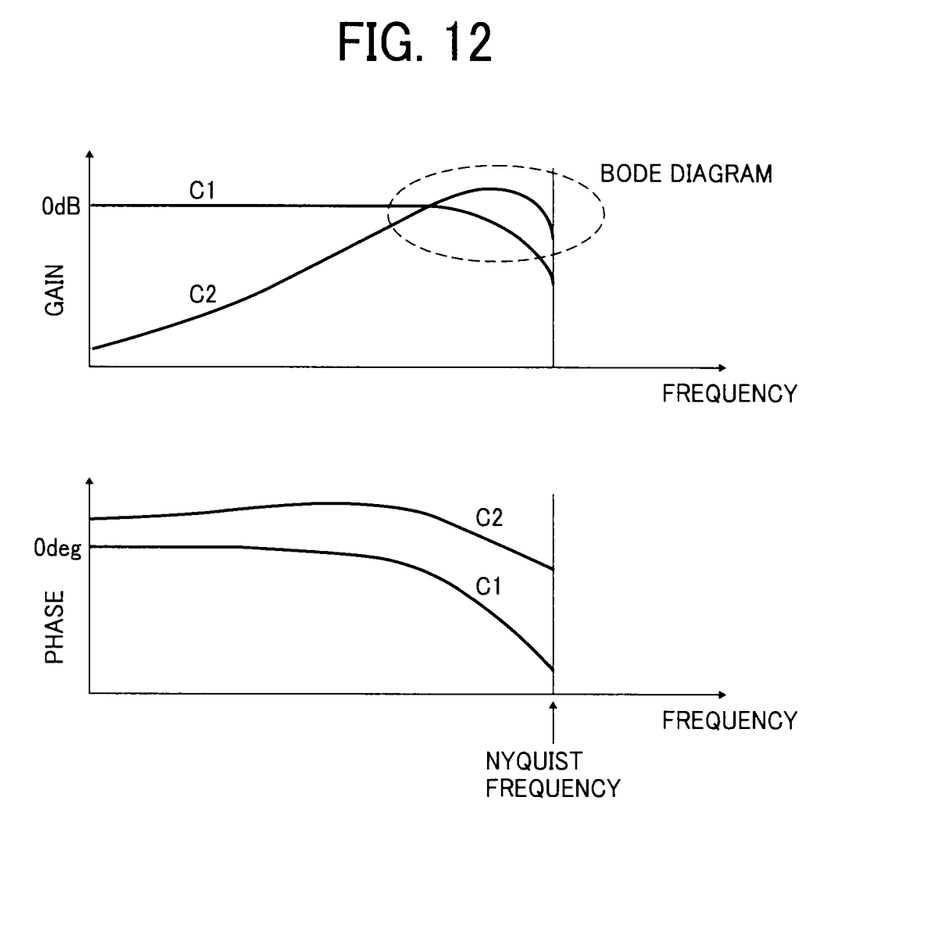
FIG. 12 is a diagram illustrating an actual closed-loop response of a discrete time control system.

FIG. 12 is a diagram illustrating an actual closed-loop response of a discrete time control system. C1 in FIG. 12 indicates complementary sensitivity function (target-follow performance), and C2 indicates sensitivity function (suppression performance). From FIG. 12, it can be seen that, compared to the ideal system, the ability to suppress disturbance is reduced (indicated by a dotted circle), and the desirable amplitude accuracy cannot be achieved.

SUMMARY OF THE INVENTION

In view of the foregoing, in one illustrative embodiment of the present invention, an optical scanner includes a light source, a scan-deflecting portion, a plurality of light-receiving sensors, a phase controller, a driving device, an amplitude controller, and an offset controller. The light source emits a laser beam. The scan-deflecting portion includes a resonance mirror to scan and deflect along a scan line including an effective scan area of a scan object while reflecting the laser beam. The plurality of light-receiving sensors for synchronous detection is provided on the scan line. The phase controller obtains a difference between a true phase that is signal-processed based on pulses from the plurality of light receiving sensors and a target phase, and generates a drive signal that incorporates the difference. The driving device supplies the drive signal generated by the phase controller to drive the resonance mirror. The amplitude controller measures time intervals during which the laser beam scanned and deflected by the scan-deflecting portion passes each of the plurality of light receiving sensors, obtains a first value equivalent to a true amplitude of scan deflection of the scan deflecting portion based on the time intervals, incorporates the difference between the first value and a second value equivalent to the target amplitude into the drive signal generated by the phase controller, and controls the amplitude of the drive signal. The offset controller measures time intervals during which the laser beam scanned and deflected by the scan deflecting portion passes each of the plurality of light receiving sensors, calculates an offset value based on the difference between each of the time intervals, incorporates the difference between a true offset value and a target offset value into the amplitude-controlled drive signal, and supplies the offset-controlled drive signal to the driving device.

In another illustrative embodiment of the present invention, an image forming apparatus for forming an image includes an image bearing member, a developing device, a transfer device, a fixing device, and the optical scanner. The image bearing member bears an electrostatic latent image on a surface thereof. The developing device develops the electrostatic latent image formed on the image bearing member using toner to form a toner image. The transfer device transfers the toner image onto the recording medium. The fixing device fixes the toner image.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 1:
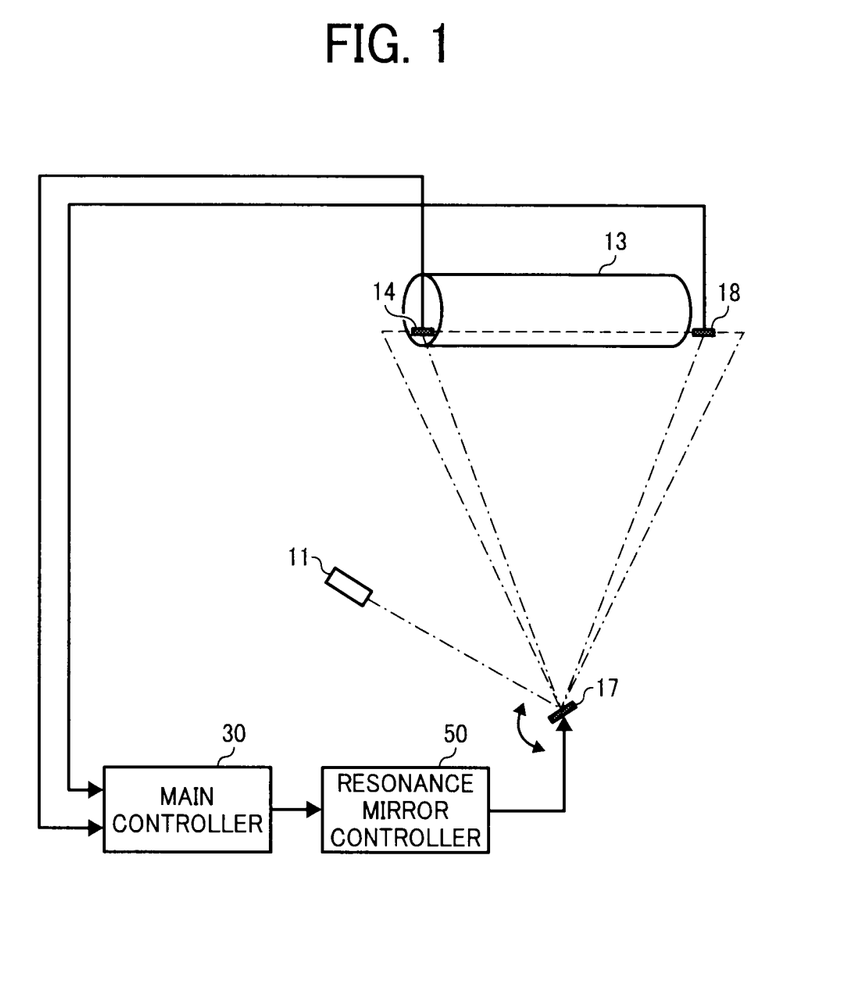
FIG. 1 is a block diagram illustrating an optical scanner according to a first embodiment of the present invention.

Referring now to the drawings, wherein like reference numerals designate identical or corresponding parts throughout the several views, and initially to FIG. 1, an optical scanner according to an illustrative embodiment of the present invention is described.

[Embodiment 1]

Figure 2:
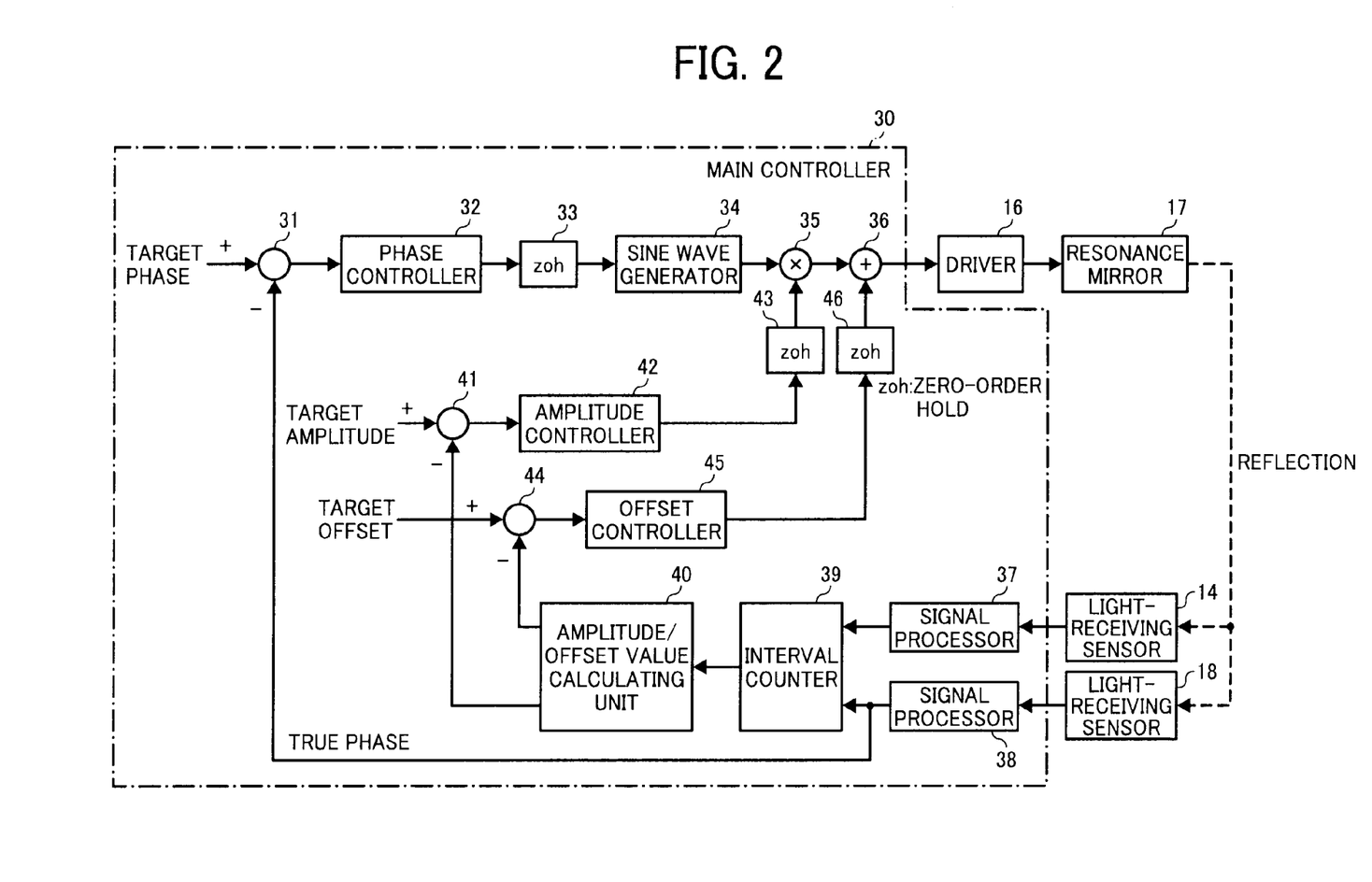
FIG. 2 is a block diagram illustrating a control system of the optical scanner according to the first embodiment of the present invention.

With reference to FIGS. 1 and 2, a description is provided of the optical scanner according to an illustrative embodiment of the present invention. FIG. 1 is a block diagram illustrating the optical scanner. FIG. 2 illustrates a block diagram illustrating a control system of the optical scanner. It is to be noted that FIG. 2 illustrates a case in which a drive signal supplied to a resonance mirror driver 16 is a sine wave generated by a sine wave generator 34 described later. However, a rectangular wave of the same frequency can be used so as to take advantage of driving at resonance point.

FIG. 1 illustrates one example of a micromirror drive control system of the optical scanner using two light-receiving sensors for synchronous detection, according to the illustrative embodiment of the present invention. The optical scanner includes a main controller 30, a resonance mirror driver 50, a resonance mirror 17, a light source 11, and light receiving sensors 14 and 18. It is to be noted that a lens system is omitted herein.

In FIG. 1, the laser beam emitted from the light source 11 is reflected by the resonance mirror 17. The reflected light then illuminates the surface of a photoreceptor drum 13. Because the resonance mirror 17 oscillates in the simple harmonic motion, the laser beam scans over the effective scan area of the photoreceptor drum 13.

The light-receiving sensors 14 and 18 are each provided substantially outside of both ends of the effective scan area. Accordingly, the time interval of the laser beam crossing the light-receiving sensors 14 and 18 is measured. That is, the interval during which the laser beam goes out of the effective scan area and reenter the effective scan area, thereby passing the same light receiving sensor 14 or 18 twice, is measured.

Figure 3:
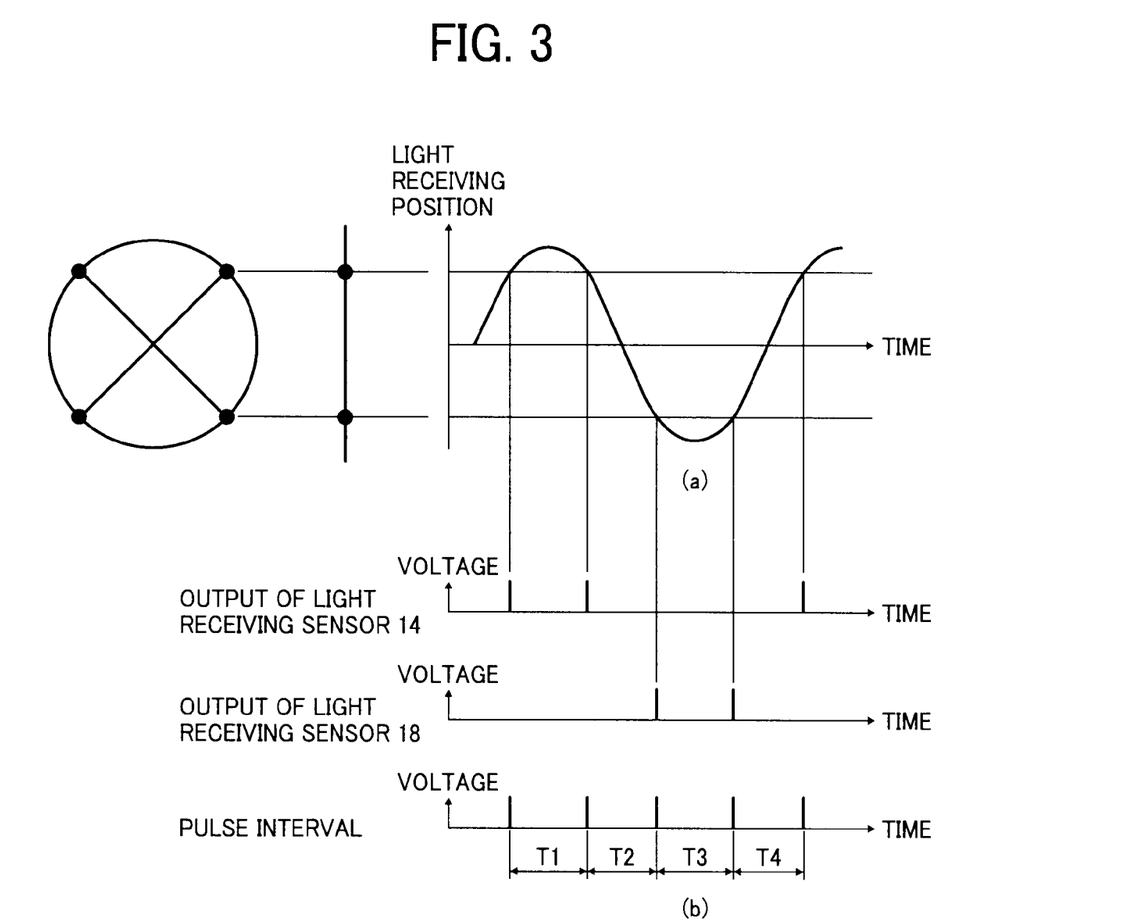
FIG. 3 is a diagram illustrating a change in a light receiving position of a light receiving sensor and time intervals according to the first embodiment of the present invention.

Furthermore, the time interval during which the laser beam passes the space between the light receiving sensors 14 and 18 is measured. Accordingly, a value equivalent of an amplitude of the resonance mirror 17 oscillating in the simple harmonic motion can be obtained. FIG. 3(a) illustrates the timing on the time axis.

According to the illustrative embodiment, two light receiving sensors 14 and 18 are each provided substantially outside of both ends of the effective scan area. Alternatively, two light receiving sensors 14 and 18 can be provided within the effective scan area, if a half mirror is provided on a scan light path, or one of the light receiving sensors can be provided outside the effective scan area and the other one is provided within the effective scan area.

With reference to FIG. 2, a description is now provided of control of the optical scanner according to the illustrative embodiment. A comparator 31 compares a true phase with a target phase. Based on the result, that is, the phase difference, a sine wave, the phase of which is regulated by a phase controller 32, a zero-order hold (ZOH) 33 that performs sampling processing, and a sine wave generator 34, is generated.

In addition to this phase control, as illustrated in FIG. 2, amplitude control for the simple harmonic oscillation of the mirror and offset control are performed using the amplitude values of each output of two light-receiving sensors 14 and 18.

Two pulses are generated from each of the light-receiving sensors 14 and 18 in one cycle of the simple harmonic oscillation of the resonance mirror 17. Each light receiving sensor generates two pulses. In accordance with each pulse, signal processors 37 and 38, and an interval counter 39 obtain intervals T1, T2, T3, and T4 of four pulses as illustrated in FIG. 3(b).

Subsequently, based on the obtained intervals T1, T2, T3, and T4, an amplitude/offset value calculating unit 40 calculates values (A, B, C, and D) equivalent of amplitudes. When T is a drive frequency period, A is T1 (A=T1), B is T/2−T2 (B=T/2−T2), C is T3 (C=T3), and D is T/2−T4 (D=T/2−T4).

A comparator 41 compares the calculated values equivalent of the amplitudes with a value equivalent of the target amplitude. Based on the difference, a multiplier 35 multiplies the phase-controlled sine wave by an amplitude coefficient generated by an amplitude controller 42 and a zero-order hold 43, thereby controlling the amplitude at a sampling frequency that is four times the drive frequency.

Based on the difference between the intervals T1 and T3 of each of the output of the light receiving sensors 17 and 18, an offset value is obtained by the amplitude/offset calculating unit 40. Then, a comparator 44 compares the obtained offset value with the target offset value.

Subsequently, based on the result or the difference, an adding device 36 adds an offset correction value generated by an offset controller 45 and a zero-order hold 46 to the sine wave, the phase and the amplitude of which are controlled. Accordingly, the offset is controlled.

This offset control system is a control system necessitated for controlling the amplitude at the frequency four times the sampling frequency. If no such a control system is provided, offset occurs on the mirror, causing the value of the light receiving sensors 14 and 18 to contain a zigzag noise component. Consequently, the amplitude accuracy is degraded. In order to remove the noise component, this control system is required.

Furthermore, there is a problem in the frequency transfer characteristics of the resonance mirror to be controlled as shown in FIG. 8 in that the phase characteristics rapidly changes in the vicinity of the resonance frequency indicated by a dotted circle. When the drive voltage for oscillating the resonance mirror in the simple harmonic motion is applied to the resonance mirror unilaterally, the output phase fluctuates easily due to fluctuation of the resonance frequency of the mirror caused by environmental change. Consequently, the phase of the simple harmonic oscillation of the mirror cannot be stabilized.

In view of the above, in order to obtain a stable output phase of the resonance mirror, the optical scanner of the present embodiment performs the amplitude control and the offset control as well as the phase control.

[Embodiment 2]

Figure 4A:
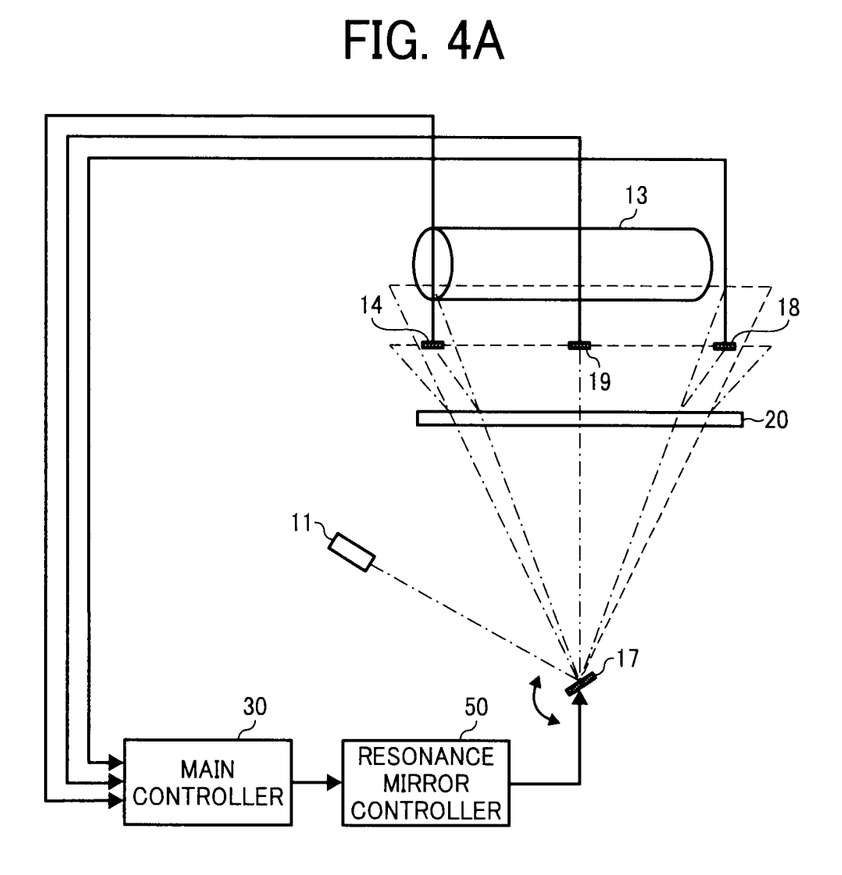
FIG. 4A and 4B are block diagrams illustrating the optical scanner according to a second embodiment of the present invention.
Figure 4B:
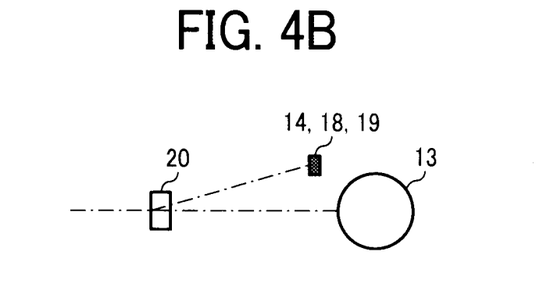
Figure 5:
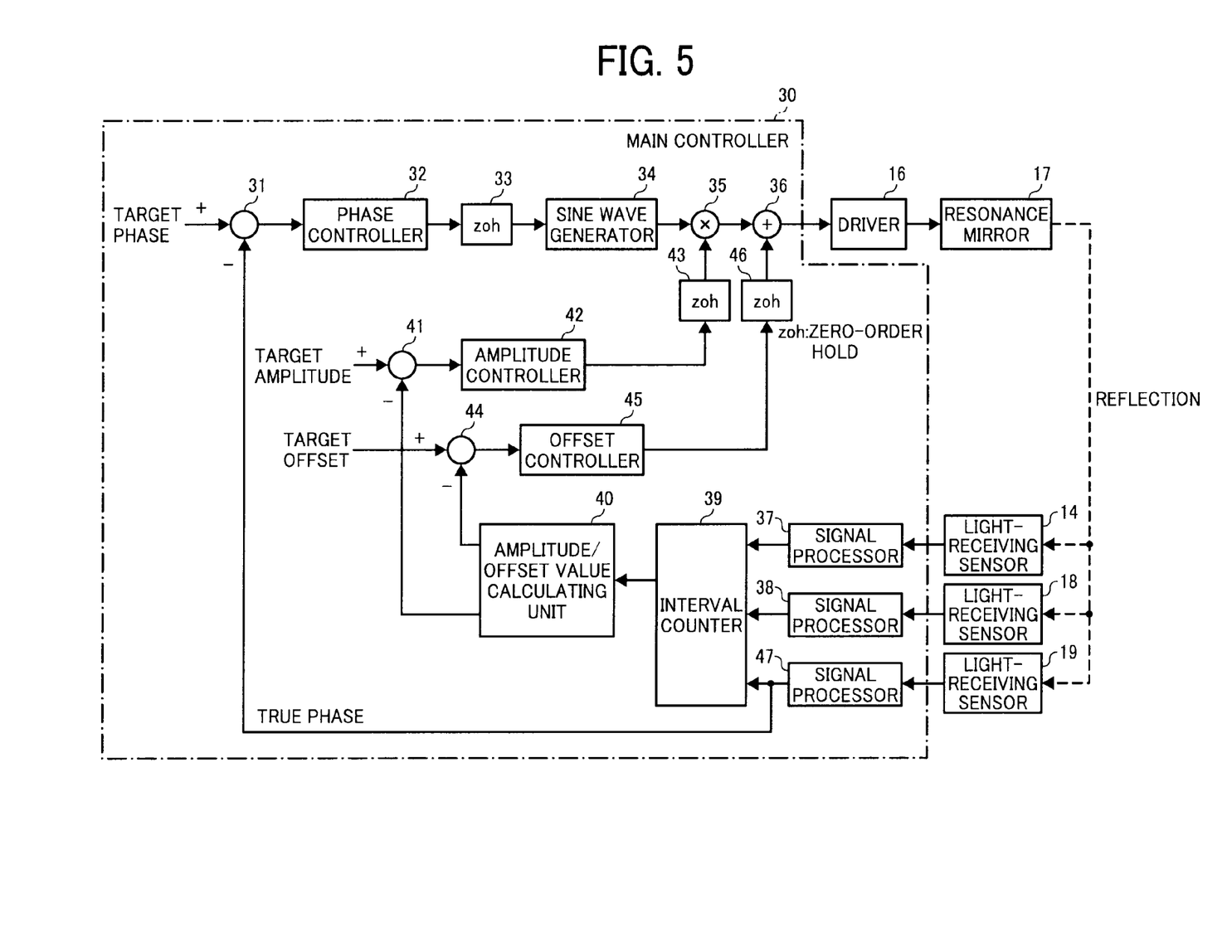
FIG. 5 is a block diagram illustrating a control system of the optical scanner according to the second embodiment of the present invention.

With reference to FIGS. 4A, 4B, and 5, a description is provided of a block diagram illustrating the optical scanner according to another illustrative embodiment. FIG. 4A and 4B are block diagrams illustrating a configuration of the optical scanner. FIG. 5 is a block diagram illustrating the control system of the optical scanner. It is to be noted that FIG. 5 illustrates a case in which the drive signal supplied to the resonance mirror driver 16 is a sine wave generated by the sine wave generator 34. However, a rectangular wave of the same frequency can be used so as to take advantage of driving at resonance point.

In FIGS. 4 and 5, the same reference numerals as that shown in FIGS. 1 and 2 are provided to the same constituent element.

FIGS. 4 and 5 illustrate an example of the micromirror drive system using three light receiving sensors for synchronous detection.

According to the present embodiment, relative to a pair of the drive system and the resonance mirror, each of the two light-receiving sensors is provided substantially outside of both ends of the effective scan area while one light receiving sensor is provided substantially at the center. The laser beam is directed to three light-receiving sensors through the half mirror 20.

As illustrated in FIG. 4A, the laser beam emitted from the light source 11 is reflected by the resonance mirror 17. The reflected light then illuminates the surface of a photoreceptor drum 13. Because the resonance mirror 17 oscillates in the simple harmonic motion, the laser beam scans on the effective scan area of the photoreceptor drum 13.

Each of the light-receiving sensors 14 and 18 is provided substantially outside of both ends of the effective scan area. Although a light-receiving sensor 19 needs to be provided at the center of the photoreceptor drum 13, it is not physically possible. Therefore, as illustrated in FIG. 4B, the half mirror 20 is used to divide the laser beam into the laser beam for writing and for the light-receiving sensors, thereby allowing the light-receiving sensors 14, 18, and 19 to be disposed at places different from the scan line on the surface of the photoreceptor drum 13.

Figure 6:
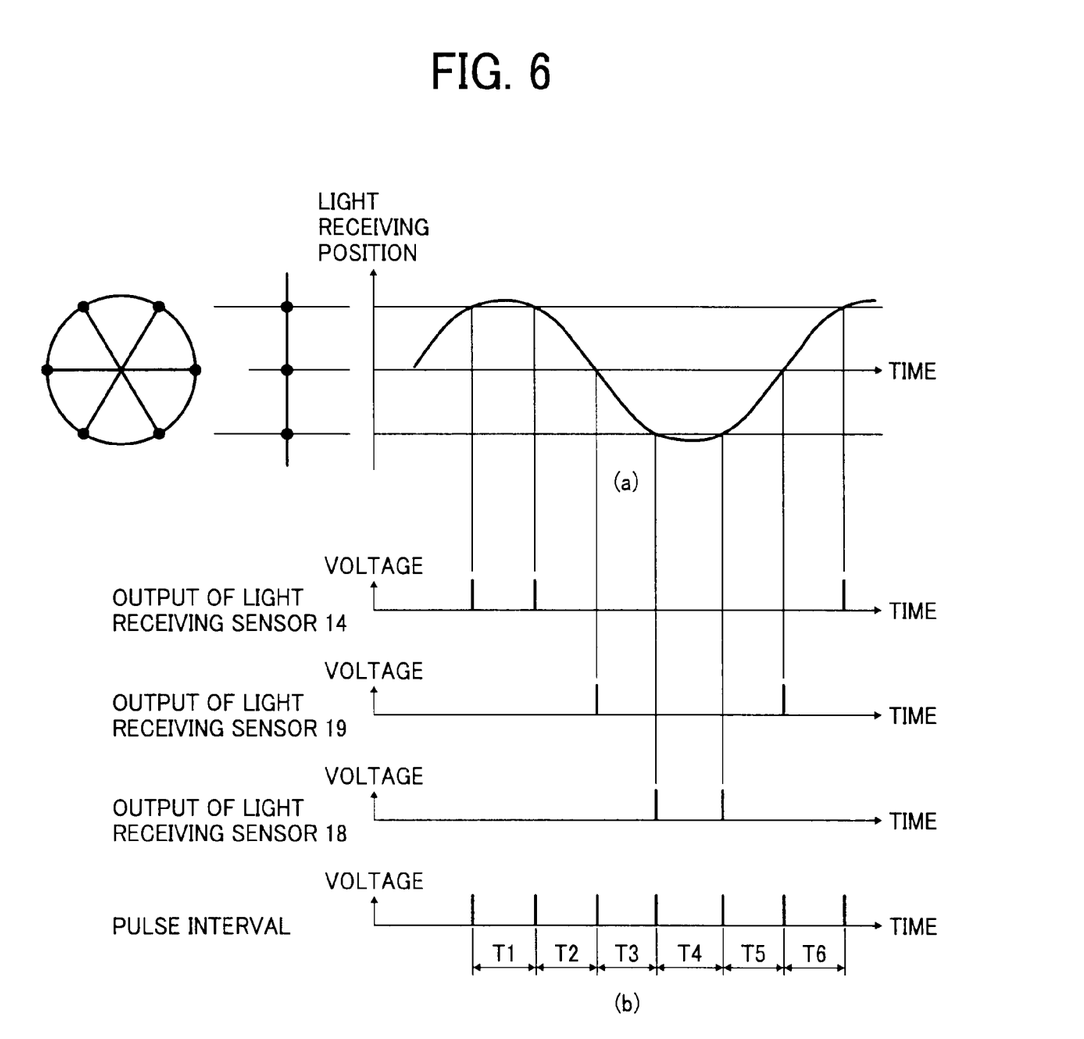
FIG. 6 is a diagram illustrating a change in the light receiving position of the light receiving sensor and time intervals according to the second embodiment of the present invention.

The time interval of the laser beam crossing the light-receiving sensors 14 and 18 at both ends of the effective scan area, and the light-receiving sensor 19 at the center thereof is measured. That is, the interval during which the laser beam goes out of the effective scan area and reenter the effective scan area is measured. The laser beam passing the same light receiving sensor 14 or 18 twice is measured. Also, the time interval during which the laser beam moves between the light-receiving sensor 14 and the light receiving sensor 19, or between the light-receiving sensor 18 and the light receiving sensor 19 is measured. Accordingly, the value equivalent of amplitude of the resonance mirror 17 oscillating in the simple harmonic motion can be obtained. FIG. 6(a) illustrates the timing on the time axis.

According to the illustrative embodiment, the optical scanner includes three light receiving sensors, two of which are provided substantially outside of both ends of the effective scan area, and the one on the scan light path within the effective scan area with the half mirror 20. Alternatively, three light receiving sensors 14, 18, and 19 can be provided within the effective scan area, or one light-receiving sensor is provided outside the effective scan area while two light-receiving sensors are provided within the effective scan area.

A description is now provided of control of the optical scanner according to the present embodiment. In FIG. 2, the comparator 31 compares the true phase with the target phase. Based on the result, that is, the phase difference, a sine wave, the phase of which is regulated by a phase controller 32, a zero-order hold (ZOH) 33 that performs sampling processing, and a sine wave generator 34, is generated.

In addition to this phase control, as illustrated in FIG. 5, the amplitude control for the simple harmonic oscillation of the mirror and offset control are performed using the amplitude values of each output of three light-receiving sensors 14 18, and 19.

In particular, six pulses are generated from the light-receiving sensors 14, 18, and 19 in one cycle of the simple harmonic oscillation of the resonance mirror 17. In accordance with each pulse, signal processors 37 and 38, and an interval counter 39 obtain intervals T1, T2, T3, T4, T5, and T6 of six pulses as illustrated in FIG. 6(b).

Subsequently, based on the obtained intervals T1, T2, T3, T4, T5, and T6, the amplitude/offset value calculating unit 40 calculates values (A, B, C, D, E, and F) equivalent of amplitudes. When T is the drive frequency period, A is T1 (A=T1), B is T/3−T2 (B=T/3−T2), C is T/2−T2−T3 (C=T/2−T2−T3), D is T4 (D=T4), E is T/3−T5 (E=T/3−T5), and F is T/2−T5−T6 (F=T/2−T5−T6).

The comparator 41 compares the calculated values equivalent of the amplitudes with the value equivalent of the target amplitude. Based on the difference, the multiplier 35 multiplies the phase-controlled sine wave by the amplitude coefficient generated by the amplitude controller 42 and the zero-order hold 43, thereby controlling the amplitude at the sampling frequency that is six times the drive frequency.

Based on the difference between the intervals T1 and T4 of each of the output of the light receiving sensors, the offset value is obtained by the amplitude/offset calculating unit 40. Then, the comparator 44 compares the obtained offset value with the target offset value.

Subsequently, based on the result or the difference, the adding device 36 adds the offset correction value generated by the offset controller 45 and the zero-order hold 46 to the sine wave, the phase and the amplitude of which are controlled. Accordingly, offset is controlled.

This offset control system is a control system necessitated for controlling the amplitude at the frequency six times the sampling frequency. If no such a control system is provided, offset occurs on the mirror, causing the detected value of the light receiving sensors 14 and 18 to contain a zigzag noise component. Consequently, the amplitude accuracy is degraded. In order to remove the noise component, this control system is required.

As described above, according to the illustrative embodiment, by using the light-receiving sensor for N-point synchronous detection where N is a positive integer, the amplitude of the simple harmonic oscillation of the mirror can be controlled at the sampling frequency of 2N times. When the control-sampling frequency is raised by 2N times relative to the mirror resonance frequency, disturbance caused by resistance of air when the mirror oscillates in the simple oscillation motion can be suppressed through control. Thus, it is possible to achieve accuracy in mirror oscillation that is expected in the writing system in the electrophotographic printer and serve also as an alternative for the polygon scanner that is driven by a motor, thereby reducing noise, heat, and power consumption.

Figure 7:
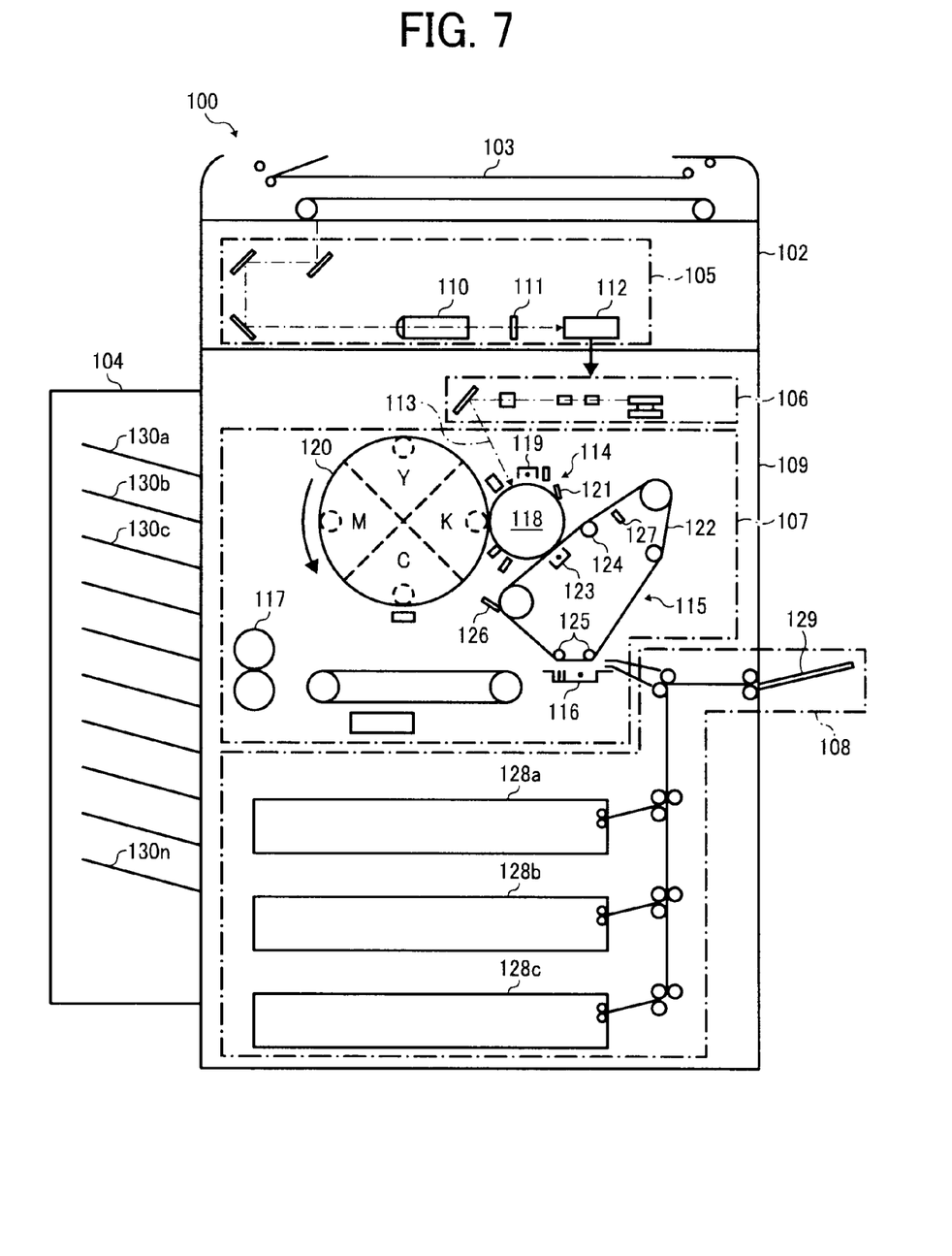
FIG. 7 is a schematic diagram illustrating a third embodiment of the present invention.

Referring now to FIG. 7, there is provided a cross-sectional view of an image forming apparatus 100 according to another embodiment of the present invention.

In FIG. 7, the image forming apparatus 100 is a digital copier and includes a main body 102, an automatic document feeder 103 (hereinafter referred to as ADF), and an automatic sorting device 104.

The main body 102 includes a printer unit 109 that includes a scanner 105 for reading an original, a writing unit 106, an engine unit 107, and a sheet feed unit 108.

The ADF 103 sends the original to read to the scanner 105. The scanner 105 includes a carriage including a light source and a plurality of mirrors, a lens 111, and a CCD 112. The scanner 105 serving as a document reading device scans and reads the original fed from the ADF 103, and then recovers the original.

The writing unit 106 includes the optical scanner of the present invention. The optical scanner includes the laser light source, the polygon mirror, and so forth. The writing unit 106 emits a laser beam 113 against the engine unit 107.

The engine unit 107 includes an image forming unit 114, a primary transfer unit 115, a secondary transfer unit 116, and a fixing unit 117. The image forming unit 114 includes a photoreceptor 118, a charger 119, a color developing device 120 consisting of colors cyan (C), magenta (M), yellow (Y), and black (K), and a drum cleaning device 121. The charger 119, the color developing device 120, and the drum cleaning device 121 are provided around the photoreceptor 118.

On the surface of the photoreceptor 118 charged by the charger 119, an electrostatic latent image is formed by the laser beam 113 emitted from the writing unit 106. The electrostatic latent image formed on the photoreceptor 118 is developed with toner by the color developing device 120 so as to form a visible image, also known as a toner image.

The primary transfer unit 115 includes an intermediate transfer belt 122, a primary transfer device 123, a tension roller 124, secondary transfer rollers 125, a cleaning device 126, and a reference position sensor 127. Each of the toner images in different colors formed on the photoreceptor 118 is primarily and overlappingly transferred onto the primary transfer belt 122, thereby forming a composite toner image.

The intermediate transfer belt 122 separates from the surface of the photoreceptor drum 118 except when the toner images on the photoreceptor 118 are primarily transferred onto the intermediate transfer belt 122. The intermediate transfer belt 122 pressingly contacts the surface of the photoreceptor 118 only when the toner images are primarily transferred onto the intermediate transfer belt 122.

The secondary transfer unit 116 secondarily transfers the composite toner image from the intermediate transfer belt 122 to the recording medium. Subsequently, the fixing unit 117 fixes the composite toner image on the recording medium through heat and pressure.

The sheet feed unit 108 includes a plurality of sheet cassettes 128a, 128b, and 128c, and a manual feed tray 129. The sheet feed unit 108 feeds the recording medium to the secondary transfer unit 116. Furthermore, the automatic sorting device 104 includes a plurality of sorting bins 130a through 130n, and sorts and discharges the recording medium on which the image is formed.

In the image forming apparatus 100, after the original is read by the scanner 105, an image forming operation starts. When the image to be formed is a single color, the toner image is formed on the photoreceptor 118 based on the image data of the original. Subsequently, the toner image formed on the photoreceptor 118 is primarily transferred onto the intermediate transfer belt 122.

The secondary transfer unit 116 secondarily transfers the toner image onto the recording medium being fed in appropriate timing such that the tip of the toner image is aligned with the recording medium. The recording medium on which the toner image is transferred is sent to the fixing unit 117 in which heat and pressure are applied to the recording medium, thereby fixing the toner image.

The recording medium on which the toner image is fixed is discharged to the automatic sorting device 104. Residual toner remaining on the intermediate transfer belt 122 is recovered by the cleaning device 126.

When the image to be formed includes two colors or more, the original is read by the scanner 105 based on a reference mark provided to the intermediate transfer belt 122 detected by the reference position sensor 127. The image data being read is stored in image memory. In accordance with the image data, a toner image of the first color is formed on the photoreceptor 118. The toner image formed on the photoreceptor 118 is primarily transferred onto the intermediate transfer belt 122.

Subsequently, a toner image of the second color is formed on the photoreceptor 118 in accordance with the image data stored in the image memory. The toner image formed on the photoreceptor 118 is primarily transferred onto the intermediate transfer belt 122. The image forming operation relative to the photoreceptor 118 and the primary transfer of the toner image onto the intermediate transfer belt 122 are repeated for each color. That is, when the image including two colors is formed, the intermediate transfer belt 122 is rotated twice. When the full-color image is formed, the intermediate transfer belt 122 is rotated four times. For each rotation, the toner images formed on the intermediate transfer belt 122 are primarily and overlappingly transferred onto the recording medium such that the positions of the toner images of each color are properly aligned.

After the composite toner image is transferred onto the intermediate transfer belt 122, the recording medium is fed in appropriate timing such that the recording medium is aligned with the tip of the composite toner image transferred onto the intermediate transfer belt 122. Accordingly, the toner image is secondarily transferred onto the recording medium. Then, the recording medium is heated and pressed by the fixing unit 117, thereby fixing the toner image onto the recording medium.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:
a light source to emit a laser beam;
a scan-deflecting portion including a resonance mirror to scan and deflect along a scan line including an effective scan area of a scan object while reflecting the laser beam;
a plurality of light-receiving sensors for synchronous detection provided on the scan line;
a phase controller configured to obtain a difference between a true phase that is signal-processed based on pulses from at least one of the plurality of light receiving sensors and a target phase, and generate a drive signal that incorporates the difference;
a driving device to supply the drive signal generated by the phase controller to drive the resonance mirror;
an amplitude controller configured to measure time intervals during which the laser beam scanned and deflected by the scan-deflecting portion passes each of the plurality of light receiving sensors, obtain a first value equivalent to a true amplitude of scan deflection of the scan deflecting portion based on the time intervals, incorporate the difference between the first value and a second value equivalent to the target amplitude into the drive signal generated by the phase controller, control the amplitude of the drive signal, and control amplitude at a control sampling frequency that is 2N times a resonance frequency of the scan deflecting portion when the number of the plurality of the light receiving sensors is N, where N is a positive integer equal to or greater than two; and
an offset controller configured to measure time intervals during which the laser beam scanned and deflected by the scan deflecting portion passes each of the plurality of light receiving sensors, calculate an offset value based on the difference between each of the time intervals, incorporate the difference between a true offset value and a target offset value into the amplitude-controlled drive signal, and supply the offset-controlled drive signal to the driving device.

2. The optical scanner according to claim 1, wherein when the number of the plurality of the light receiving sensors is N.

3. The optical scanner according to claim 1, wherein the phase controller, the amplitude controller, and the offset controller operate simultaneously at the control sampling frequency.

4. The optical scanner according to claim 1, wherein the plurality of light receiving sensors is provided outside of both ends of the effective scan area.

5. The optical scanner according to claim 1, wherein the plurality of light receiving sensors is provided within the effective scan area.

6. The optical scanner according to claim 5, further comprising:
a half mirror to direct the laser beam to the light receiving sensors, the half mirror provided on a light path of the laser beam scanned and deflected in the effective scan area by the scan deflecting portion.

7. The optical scanner according to claim 1, wherein, based on the difference between the first value obtained based on the time intervals and the second value, the amplitude controller multiplies the drive signal generated by the phase controller by an amplitude coefficient.

8. The optical scanner according to claim 1, wherein, based on the difference between the offset value and the target offset value, an offset correction value is added to the amplitude-controlled drive signal which is then supplied to the driving device by the offset controller.

9. An image forming apparatus for forming an image, comprising:
an image bearing member configured to bear an electrostatic latent image on a surface thereof;
a developing device configured to develop the electrostatic latent image formed on the image bearing member using toner to form a toner image;
a transfer device configured to transfer the toner image onto the recording medium;
a fixing device configured to fix the toner image; and
an optical scanner including
a light source to emit a laser beam;
a scan-deflecting portion including a resonance mirror to scan and deflect along a scan line including an effective scan area of a scan object while reflecting the laser beam;
a plurality of light-receiving sensors for synchronous detection provided on the scan line;
a phase controller configured to obtain a difference between a true phase that is signal-processed based on pulses from at least one of the plurality of light-receiving sensors and a target phase, and generate a drive signal that incorporates the difference;
a driving device to supply the drive signal generated by the phase controller to drive the resonance mirror;
an amplitude controller configured to measure time intervals during which the laser beam scanned and deflected by the scan-deflecting portion passes each of the plurality of light receiving sensors, obtain a first value equivalent to a true amplitude of scan deflection of the scan deflecting portion based on the time intervals, incorporate the difference between the first value and a second value equivalent to the target amplitude into the drive signal generated by the phase controller, control the amplitude of the drive signal, and control amplitude at a control sampling frequency that is 2N times a resonance frequency of the scan deflecting portion when the number of the plurality of the light receiving sensors is N, where N is a positive integer equal to or greater than two; and
an offset controller configured to measure time intervals during which the laser beam scanned and deflected by the scan deflecting portion passes each of the plurality of light receiving sensors, calculate an offset value based on the difference between each of the time intervals, incorporate the difference between a true offset value and a target offset value into the amplitude-controlled drive signal, and supply the offset-controlled drive signal to the driving device.

* * * * *